United States Patent

Guindy et al.

[11] Patent Number: 5,961,671
[45] Date of Patent: Oct. 5, 1999

[54] APPARATUS AND METHOD OF PREPARING ELECTROCHEMICAL CELLS

[75] Inventors: Wade Guindy; Steven D. Cochran; Carl Richwine; George Adamson, all of Henderson; Porter H. Mitchell, Las Vegas, all of Nev.

[73] Assignee: Valence Technology, Inc., Henderson, Nev.

[21] Appl. No.: 08/932,735

[22] Filed: Sep. 17, 1997

Related U.S. Application Data

[63] Continuation-in-part of application No. 08/616,827, Mar. 15, 1996, Pat. No. 5,690,703.
[51] Int. Cl.$^6$ .................................................. H01M 10/38
[52] U.S. Cl. ........................................ 29/623.1; 134/95.2
[58] Field of Search ...................... 29/623.1; 134/95.2; 68/5 C

[56] References Cited

U.S. PATENT DOCUMENTS

| | | | |
|---|---|---|---|
| 3,969,196 | 7/1976 | Zosel | 203/49 |
| 4,012,194 | 3/1977 | Maffei | 8/142 |
| 4,219,333 | 8/1980 | Harris | 8/137 |
| 4,765,798 | 8/1988 | Batson et al. | 29/623.1 |
| 4,885,007 | 12/1989 | Wegner | 29/623.5 |
| 5,013,366 | 5/1991 | Jackson et al. | 134/1 |
| 5,123,176 | 6/1992 | Yamada et al. | 34/32 |
| 5,267,455 | 12/1993 | Dewees et al. | 68/5 C |
| 5,540,741 | 7/1996 | Gozdz et al. | 29/623.5 |
| 5,584,893 | 12/1996 | Mitchell | 29/623.5 |
| 5,690,703 | 11/1997 | Mitchell et al. | 29/623.5 |
| 5,772,702 | 6/1998 | Barker et al. | 29/623.5 |

FOREIGN PATENT DOCUMENTS

| | | |
|---|---|---|
| 3323940 | 1/1985 | Germany . |
| WO95/15589 | 6/1995 | WIPO . |

OTHER PUBLICATIONS

Chemac Inc. $CO_2$ Brochure entitled "High Pressure Extraction"—Date Unknown.
Phasex Corporation Brochure entitled "Supercritical Solutions for Critical Problems"—Date Unknown.
Pressure Products Industries, Inc. Bulletin entitled "Supercritical Extraction System"—Date Unknown.
Brogle "$CO_2$ as a Solvent: its Properties and Applications", *Chemistry and Industry*, Jun. 1982.
Hyatt "Liquid and Supercritical Carbon Dioxide as Organic Solvents ", *J. Org. Chem.*,(1984), 49:5097–5101 (Month Unknown).
"Supercritical Fluids ", Kirk–Othmer encyclopedia of Chem. Tech,. 3rd Ed. (1978 ) Supp. vol. 872–893 (Month N.A.).
"Blood, Coagulants and Anticoagulants to Cardiovascular Agents", Kirk–Othmer Encyclopedia of Chem. Tech., 3rd Ed. vol. 4, 725–742 (1978, Month N.A.).
Asahi Denka Kogyo KK, Patent Abstracts of Japan, vol. 13, No. 224, JP 01036605, Feb.7, 1989.

*Primary Examiner*—Stephen Kalafut
*Attorney, Agent, or Firm*—Young & Basile, P.C.

[57] ABSTRACT

A method for removing plasticizers such dibutyl phthalate from the anode, cathode, and polymeric matrix components of electrochemical cell precursors using carbon dioxide in the supercritical state is provided. The method forms porous polymeric structures that enhances the mass transport of ions in the cell which results in improved electrochemical performance.

30 Claims, 4 Drawing Sheets

5,961,671

APPARATUS AND METHOD OF PREPARING ELECTROCHEMICAL CELLS

This is a continuation-in-part of application Ser. No. 08/616,827, filed on Mar. 15, 1996 now U.S. Pat. No. 5,690,703.

FIELD OF THE INVENTION

This invention relates to fabricating solid electrochemical (electrolytic) cells and, more particularly, to a method of employing a supercritical fluid to extract solvents from an electrochemical cell (or precursor thereof) in order to develop a porous macrostructure in the anode, cathode, and/or polymeric matrix which enhances the mass transport of the salts in the electrolyte solution.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode. Non-aqueous lithium electrochemical cells are discussed in U.S. Pat. Nos. 4,472,487, 4,668,595, 5,028, 500, 5,441,830, 5,460,904, and 5,540,741.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

Various factors influence the performance of electrochemical cells. For instance, the morphology of the polymeric matrix and of the polymeric binders in the anode and/or cathode can affect conductivity of the salts. Enhancement of conductivity has been demonstrated by forming porous polymeric matrices and polymeric binders. One method of producing such porous structures comprises forming polymeric structures in the presence of a plasticizer; upon removal of the plasticizer, pores are created in the polymer. These plasticizers have high boiling points and are difficult to remove. Current methods of removing these solvents include extraction wherein the separating agent is another organic liquid solvent such as dimethyl ether, methanol, and cyclohexane. These processes tend to be expensive and environmentally hazardous.

SUMMARY OF THE INVENTION

In view of the shortcomings in the prior art, there is a need for an inexpensive, non-toxic, and environmentally safe method of removing plasticizers from electrochemical cells.

In one aspect, the invention is directed to a method of preparing an electrochemical cell comprising an anode, a cathode, and a polymeric layer interposed between the anode and cathode which includes the steps of:

(a) forming an anode composition comprising a carbon material, a first polymer, and a first plasticizer;

(b) forming a cathode composition comprising a cathode active material, a second polymer, and a second plasticizer;

(c) forming a polymeric matrix comprising a third polymer and third plasticizer that is interposed between the anode composition and cathode composition; and (d) removing said first, second, and third plasticizers by extraction with a supercritical fluid comprising carbon dioxide to form an electrochemical cell precursor which comprises contacting said anode composition, cathode composition, and polymeric matrix to said supercritical fluid, wherein said supercritical fluid during said contacting is maintained for a sufficient length of time such that the supercritical fluid takes up at least a portion of said plasticizers, and wherein during said contact the temperature of the supercritical fluid is maintained between about 32° C. to 60° C. and the pressure of the supercritical fluid is maintained between about 1,100 psi to 4,000 psi.

A feature of the invention is that the layers of the electrochemical cell do not become delaminated during the extraction process by the supercritical fluid. The electrochemical cell precursor so prepared can be stored before being activated by introducing an electrolyte solution comprising an electrolyte solvent and salt into the electrochemical precursor.

DETAILED DESCRIPTION OF PREFERRED EMBODIMENTS

Figure 1:
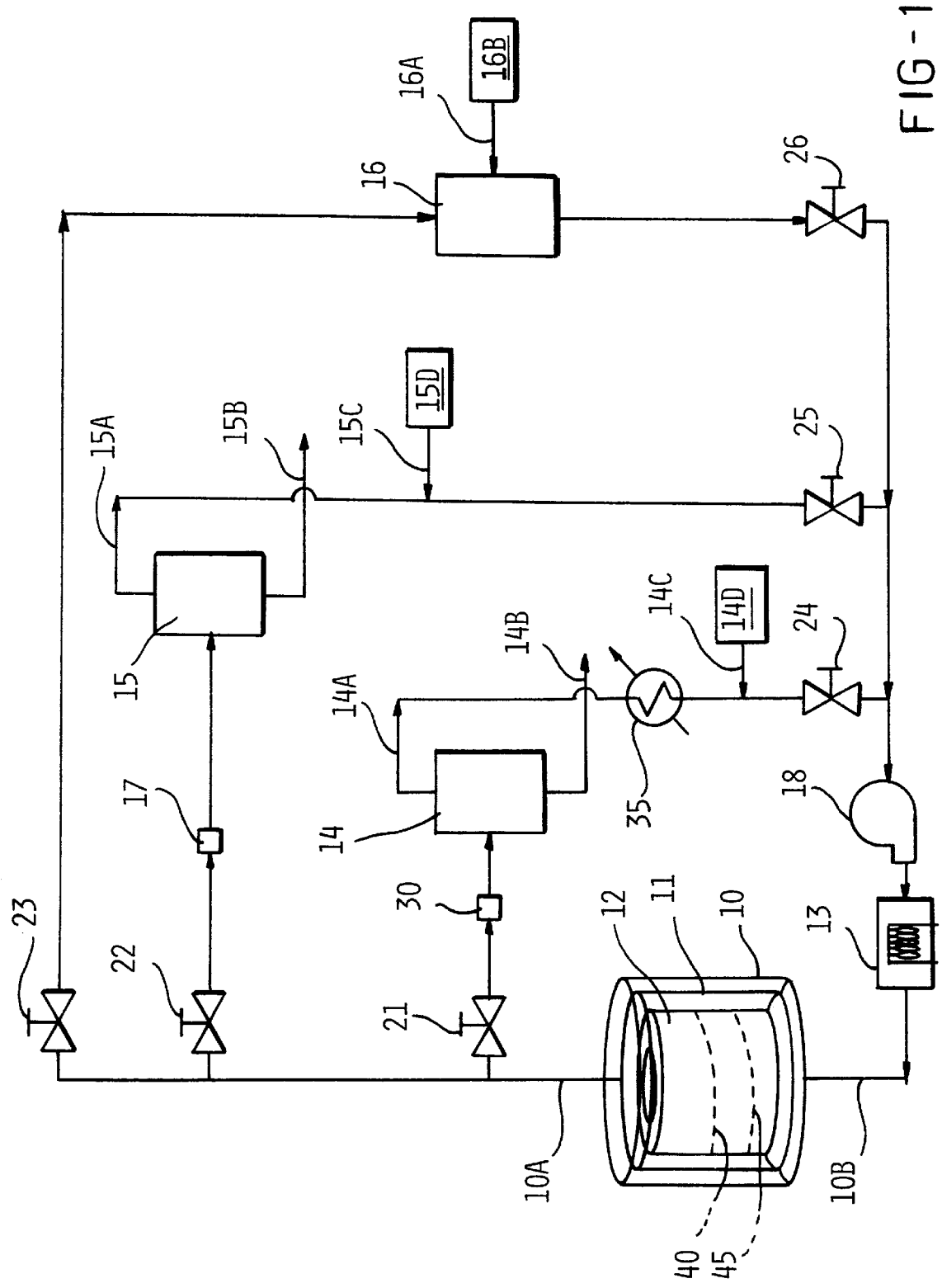
FIG. 1 is a schematic flow diagram showing a supercritical extraction system.

The present invention is based in part on the discovery that a supercritical fluid such as carbon dioxide can be employed to effectively remove plasticizers such as dibutyl phthalate from the anode, cathode, and/or polymeric matrix of the precursor of an electrochemical cell. Upon removal of the plasticizer, the polymer network of these components has a stable porous structure. Thereafter, the precursor is activated by the addition of an electrolyte solution comprising electrolyte solvents and salts. Electrochemical cells so fabricated demonstrate superior electrochemical performance. The plasticizer is also recovered in a recycle process.

Preferred cells include: a cathode comprising an active material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode preferably has a current collector. Particularly preferred electrochemical cells and batteries use lithium and salts thereof.

Prior to describing this invention in further detail, the following terms will be defined.

The term "supercritical fluid" refers to dense gases, compressed gases, supercritical gases, high pressures gases, dense fluids, and the like, that are suitable for extracting plasticizers from polymeric materials. Supercritical fluids are known in the art and are described, for example, in "Supercritical Fluids," *Kirk-Othmer Encyclopedia of Chem. Tech.*" 3d ed. (1978) Sup. Vol. pp. 875–983. Preferred supercritical fluids include, for example, (1) dense gases which are gases that have been compressed and heated to either supercritical or subcritical conditions to achieve liquid-like densities and (2) dense fluids which are fluids that have been heated to achieve similar conditions. Dense gases and fluids are known in the art. See, for example, U.S. Pat. Nos. 5,013,366, 5,267,455, 4,219,333, 4,012,194, and 3,969,196 which are incorporated herein. Suitable dense gases include, for example, carbon dioxide, methane, ethane, propane, butane, ethylene, propylene, ammonium-butane, sulfur hexafluoride, nitrous oxide and mixtures thereof. Suitable dense fluids include n-pentane, n-hexane, cyclohexane, n-heptane, methanol, ethanol, isopropanol, benzene, toluene, p-xylene, chlorotrifluoromethane, trichlorofluoromethane, perfluoropropane, chlorodifluoromethane, and mixtures thereof. As is apparent, for the present invention, supercritical fluids also include fluids which are present in subcritical conditions. This occurs, for instance, when a dense gas (or mixture of gases) is shifted between its supercritical and subcritical states to enhance its extraction capabilities.

The supercritical fluid is employed to remove plasticizers from an anode composition, a cathode composition, and/or polymeric matrix composition of an electrochemical cell precursor wherein each composition comprises polymers. As the plasticizer is extracted, pores are created in the three dimensional structure of the polymer. The choice of the supercritical fluid employed depends on, among other things, the plasticizer(s) present, the compatibility of the supercritical fluid to the electrochemical cell components, costs, and safety. When dibutyl phthalate is used as the plasticizer, a preferred supercritical fluid is carbon dioxide. The critical temperature of carbon dioxide is 32° C. and the critical pressure is 72.9 atmospheres (1,071 psi).

Secondary lithium ion batteries exhibiting good electrochemical cell performance are fabricated by the inventive method wherein the supercritical fluid is maintained at the lower end of its critical region. When $CO_2$ is employed it is maintained at a temperature preferably between 32° C. and 60° C., more preferably between 35° C. and 50° C., and most preferably between 35° C. and 45° C. and at a pressure preferably between 1,100 psi and 4,000 psi, more preferably between 1,600 psi and 3,000 psi, and most preferably between 1,800 psi and 2,600 psi. Batteries so fabricated exhibited superior characteristics, e.g., cycle life and fading, as compared to batteries fabricated with processes wherein the $CO_2$ is at higher pressures and/or temperatures. It is believed that the high solubility of $CO_2$ in plasticizers such as DBP causes the formation of $CO_2$ bubbles in the films of the battery. As the $CO_2$ expands inside the films, delamination of the battery, that is, detachment of the films therein, occurs. High temperature and/or high pressure conditions of the supercritical fluid facilitates this phenomenon.

The term "plasticizer" refers to an organic compound, having limited solubility of the polymers that form the polymeric matrix of the separator (or solid electrolyte) layer and of the polymer binders in the anode and cathode, which facilitates the formation of porous polymeric structures. Plasticizers typically comprise organic compounds, including low molecular weight polymers, that are liquids at ambient temperatures and which can be extracted by the inventive process. Preferred plasticizers include, for example, dibutyl phthalate, dioctylph-thalate, actates, glymes, and low molecular weight polymers. By "porous structure" is meant that upon removal of the plasticizer the polymeric matrix and binders remain as a porous mass. Suitable plasticizers have boiling points typically above about 130° C. Preferably the boiling point of the plasticizer is from 145° C. to 550° C.; more preferably 160° C. to 450° C. and most preferably 175° C. to 350° C.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an organic or inorganic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501, 921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier, For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. Suitable substrates include, for example, paper, e.g, 20 or 24 weight paper, polyester (MYLAR™), polypropylene, polyethylene films and non-woven webs.

Preferably, the solid polymeric matrix is formed by a casting process which does not require the use of monomers or prepolymers, that is, no curing is required. A preferred method employs a copolymer of vinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25% of the inorganic ion salt based on the total weight of the electrolyte; preferably, from about 10 to 20%; and even more preferably from about 10 to about 15%. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. A preferred solvent comprises a mixture of ethylene carbonate and ethyl methyl carbonate. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4—ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl- 1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6—trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10% and more preferably at about 2.5% based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The composite cathode preferably comprises a compatible cathodic material (i.e., insertion compounds) which is any material which functions as a positive pole in a solid electrolytic cell. Such compatible cathodic materials are well known in the art and include, by way of example, transition metal oxide materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathodeactive material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65% of a compatible cathodic material; from about 1 to 20% of an electroconductive agent; from about 1 to 20% of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20% of polyethylene oxide having a number average molecular weight of at least 100,000; from about 10 to 50% of solvent comprising a 10:1 to 1:4 (w/w) mixture of an organic carbonate and a glyme; and from about 5 to about 25% of a sold matrix forming monomer or partial polymer thereof. Also included is an ion conducting amount of an inorganic ion salt. Generally, the amount of the salt is from about 1 to about 25%. (All percents herein are based on weight unless otherwise specified.)

The electrolyte composition typically comprises from about 5 to about 25% of the inorganic ion salt based on the total weight of the electrolyte; preferably, from about 10 to 20%; and even more preferably from about 10 to about 15%. The percentage of salt depends on the type of salt and electrolytic solvent employed.

The electrolyte composition typically comprises from 0 to about 80% electrolyte solvent (e.g., organic carbonate/ glyme mixture) based on the total weight of the electrolyte; preferably from about 60 to about 80%; and even more preferably about 70%.

The electrolyte composition typically comprises from about 5 to about 30% of the solid polymeric matrix based on the total weight of the electrolyte; preferably from about 15 to about 25%.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10% and more preferably at about 2.5% based on the total weight of the electrolyte composition.

METHODOLOGY

Electrochemical cells are known in the art. See, for example, U.S. Pat. Nos. 5,584,893, 5,300,373, 5,316,556, 5,346,385, 5,262,253, 4,472,487, 4,668,595, and 5,028,500, all of which are incorporated herein. The inventive method can be adapted to form porous anode, cathode, and/or polymeric matrix structures in prior art electrochemical cells.

The following illustrates a method of how an electrolytic cell could be fabricated. Examples 1 and 2 describe the process of preparing the anode slurry and cathode slurry, respectively. Example 3 describes the procedures for fabricating a solid electrolytic cell.

The anode generally comprises an anode film that is laminated onto one or both sides of the current collector. Similarly, the cathode generally comprises a cathode film that is laminated onto one or both sides of the cathode current collector. The current collector comprises, for example, a screen, grid, expanded metal, woven or nonwoven or knitted wire fabric formed from an electron conductive material such as metals or alloys. Each current collector is also connected to a current collector tab which extends from the edge of the current collector. In batteries comprising multiple electrochemical cells, the anode tabs are preferably welded together and connected to a lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

EXAMPLE 1

The anode current collector employed is a sheet of expanded copper metal that is about 50 μm thick. It is available under the designation 2Cu5-125 (flatten) from Delker Corp., Branford, Conn. The anode slurry is prepared as follows:

A polymer mixture comprising a copolymer of vinylidenedifluoride (VDF) and hexafluoropropylene (HFP) is prepared by mixing 6.8 grams of the copolymer in 20 grams of acetone. The copolymer (ave. MW 125K) is Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture is prepared separately by first adding 23.4 grams of graphite into 0.9 grams of carbon black into a solution containing 60 grams acetone, and 10.5 grams DBP (plasticizer). A preferred graphite comprises a purified natural graphite available under the designation BG 35™ from Superior Graphite Co., Chicago, Ill. A preferred carbon black is available under the designation Super P™ from M.M.M. Carbon, Willebroek, Belgium. (Optionally, about 0.5 grams of a surfactant such as Pluronic FC68™ from BASF, Mt. Olive, N.J. and Flurad 430™ from 3M Co. St. Paul, Minn. can be added to the graphite mixture to help disperse the graphite.) The graphite mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was casted onto each side of the current collector. Anode films form when the remaining portion of the acetone evaporates.

EXAMPLE 2

The cathode current collector employed is a sheet of expanded aluminum that is about 50 $\mu$m thick. The aluminum grid is available under the designation 2AL5-077 from Delker Corp. The cathode slurry is prepared as follows:

A polymer mixture comprising a copolymer of vinylidenedifluoride (VDF) and hexafluoropropylene (HFP) is prepared by mixing 4.4 grams of the copolymer in 15 ml of acetone. The copolymer is Kynar Flex 2801™. The mixture is stirred for about 24 hours in a milling jar.

A cathode mixture is prepared separately by first adding 28.9 grams of a cathode-active material comprising $Li_xMn_2O_4$ (spinel) ($0 \leq x < 2$), 2.4 grams of carbon black (Super ™) into a solution containing 60 grams acetone, and 8.7 grams DBP. The mixture is then vigorously mixed in a high shear mixer until a substantially homogeneous blend was formed. (Optionally, about 0.5 grams of a surfactant can be added to the cathode mixture.)

The cathode slurry is prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films can be formed directly on the current collector by casting the slurry mixtures onto the current collector surfaces. Alternatively, each film can be prepared by first casting a slurry onto a substrate or carrier web and allowing the solvent to evaporate thus leaving the film. Thereafter, the films can be casted onto each side of the current collector.

EXAMPLE 3

An electrochemical cell precursor is prepared by positioning a polymeric matrix between the anode and cathode films and thereafter laminating the tri-layer structure under moderate pressure and/or temperature (e.g., 130° C.). The pressure and temperature employed will depend on the polymer(s) forming the matrix. The polymeric matrix is formed by casting a slurry comprising acetone, DBP, silanized fumed $SiO_2$, and a VDF/HFP copolymer onto a carrier web or other substrate and allowing the acetone to evaporate. The $SiO_2$ is a filler which imparts toughness and strength to the film. In addition, it is believed that the $SiO_2$ assists the activation process by creating physico-chemical conditions such that the electrolyte solution quickly and completely fills the pores created by the removal of the DBP. Preferably, the slurry is mixed under low shear conditions as not to degrade the copolymer. The anode, cathode, and separator films can be prepared separately or each can be fabricated in the form of a long web and stored as individual rolls. Each web can be cut to size as needed.

Next, the dibutyl phthalate plasticizer is extracted and activated by the inventive process. In a preferred method, the precursor can be pre-packaged in moisture-impermeable material which is described, for example, in U.S. Pat. No. 5,326,653, which is incorporated herein, before being extracted of the plasticizer and then activated. Thereafter, the packaging is sealed.

An exemplary system for carrying out the process of the present invention is shown diagrammatically in FIG. 1. The system includes a pressure chamber 10 having a compartment which is in communication with extraction solvent (e.g., supercritical fluid) purifier 14 which may comprise a flash distillation unit. Purifier 14 has extraction solvent outlet 14A and plasticizer outlet 14B. The chamber and purifier form the extraction loop which further includes UV sensor 30, pump 18, subcooler 35, and heater 13. The flow rate through this loop can be regulated by valves 21 and 24. Extraction solvent is supplied into the loop through inlet 14C from extraction solvent source 14D. The cylindrical pressure chamber has an end cover which can be removed to create an opening into its interior. Further, the end portions of the chamber are connected to outlet pipe 10A and inlet pipe 10B, respectively. When the chamber is closed, each of these pipes extends part-way into the interior of the chamber so that the openings of the pipes can be coupled to a container that has been placed inside the chamber.

Chamber 10 is also in communication with moisture separator 15 which may comprise a column of activated molecular sieves, alumina or other suitable drying agent. The separator has dry gas outlet 15A and moisture outlet 15B. The chamber and separator form the drying loop which further includes moisture sensor 17, pump 18, and heater 13. The flow rate through this loop can be regulated by valves 22 and 25. Dry gas is supplied into the loop through inlet 15C from gas source 15D.

Finally, the chamber is in communication with electrolyte solution reservoir 16 which can be filled and replenished through inlet 16A from electrolyte solution source 16B. The chamber and reservoir form the activation loop which further includes pump 18, and heater 13. The flow rate through this loop can be regulated by valves 23 and 26.

The system can accommodate electrochemical cell precursors (and batteries precursors) of any configuration. In this example, battery precursor 12 containing a plasticizer has a jelly-roll structure. In operation, the battery precursor is first placed in a hermetically sealable transport vessel 11 that is equipped with pressure operated one-way valves (not shown) located at the top and bottom of the cylindrically-shaped transport vessel. The vessel is configured so that once it is placed into chamber 10 and the chamber is sealed, pipe 10A is coupled to the top one-way valve and pipe 10B is coupled to the bottom one-way valve. The interior of the sealable transport vessel also includes heating coils 40 and cooling coils 45 which can be employed to adjust the temperature of the fluid(s) (e.g., supercritical fluids) inside the sealable transport vessel. Thereafter, extraction solvent from reservoir 16 is pumped into the transport vessel through pipe 10B. Plasticizer is extracted from the battery precursor when it comes into contact with the extraction solvent. The extraction solvent circulates through the extraction loop until the level of plasticizer as indicated by the UV sensor is below a preset level. During the circulation of the extraction solvent, the plasticizer is removed by purifier 14; the extraction solvent also is recovered.

Following extraction of the plasticizer, heated dry gas (e.g., air, nitrogen, argon, carbon dioxide) is pumped through into the transport vessel through pipe 10B. Circulation of the air continues until the concentration reaches a preset level as indicated by the moisture sensor. During the circulation, moisture is removed by separator 15 while dry air is recovered. Finally, the activation step comprises pumping sufficient amounts of the electrolyte solution, which contains an electrolyte solvent and a salt, into the transport vessel and allowing it to permeate into the precursor. The electrolyte solution can be heated and/or pressurized to facilitate absorption. It should be noted that following removal of the plasticizer, the electrochemical cell precursor can be stored for 24 hours or longer before being activated.

Any suitable supercritical fluid can be employed as the extraction solvent for the plasticizer; carbon dioxide is preferred. During the extraction process, the temperature and pressure of the dense gas in the transport vessel can be moderated/maintained, for instance, with pump 18 sub-cooler 35, heater 13, heating coils 40 and/or cooling coils 45. The supercritical fluids which may be used in accordance with the present invention include, for example, any of the known gases or fluids which may be converted to supercritical fluids or liquified at temperatures and pressures which will not degrade the physical or chemical properties of the electrochemical cell precursor and will extract the particular plasticizer used. In some cases, a mixture of two or more supercritical fluids may be formulated in order to have the desired solvent properties.

Carbon dioxide maintained at the above described temperature and pressure ranges is the preferred supercritical fluid for use in practicing the present invention since it is inexpensive and non toxic and is particularly suited for extracting dibutyl phthalate. At pressures above the critical point, the phase of the carbon dioxide can be shifted between the liquid phase and supercritical fluid phase by varying the temperature above or below the critical temperature of 305° K. Typical process parameters which have been found to be useful include, but are not limited to, the following: variation of the temperature by about 10° to about 100° K. or higher above the critical temperature; variation of the temperature below the critical temperature by about 5 to 10° K.; variation of pressure by about 100 to about 2100 psi above the critical pressure; variation of the pressure below the critical temperature by about 5 to 20 psi; and residence time of the extraction step of about 2 to 45 minutes.

When extracting the plasticizer, the supercritical fluid can be maintained at a supercritical state or at a subcritical state. Alternatively, the supercritical fluid is phase shifted in order to provide a spectrum of solvents which are capable of removing a variety of plasticizers and/or contaminants. "Phase shifting" is used herein to mean a shift between the liquid state and the supercritical state and another, e.g, subcritical state. The phase shifting is accomplished by varying the temperature and/or pressure of the supercritical fluid. For example, phase shift can be achieved by maintaining the pressure at a relatively constant level which is at or above the critical pressure of the supercritical fluid and varying the temperature or by maintaining the temperature and varying pressure. The pressure is predetermined by computation to provide the necessary solvent spectrum during temperature cycling. Phase shifting is described in U.S. Pat. No. 5,013,366 which is incorporated herein.

EXPERIMENTAL

Figure 2:
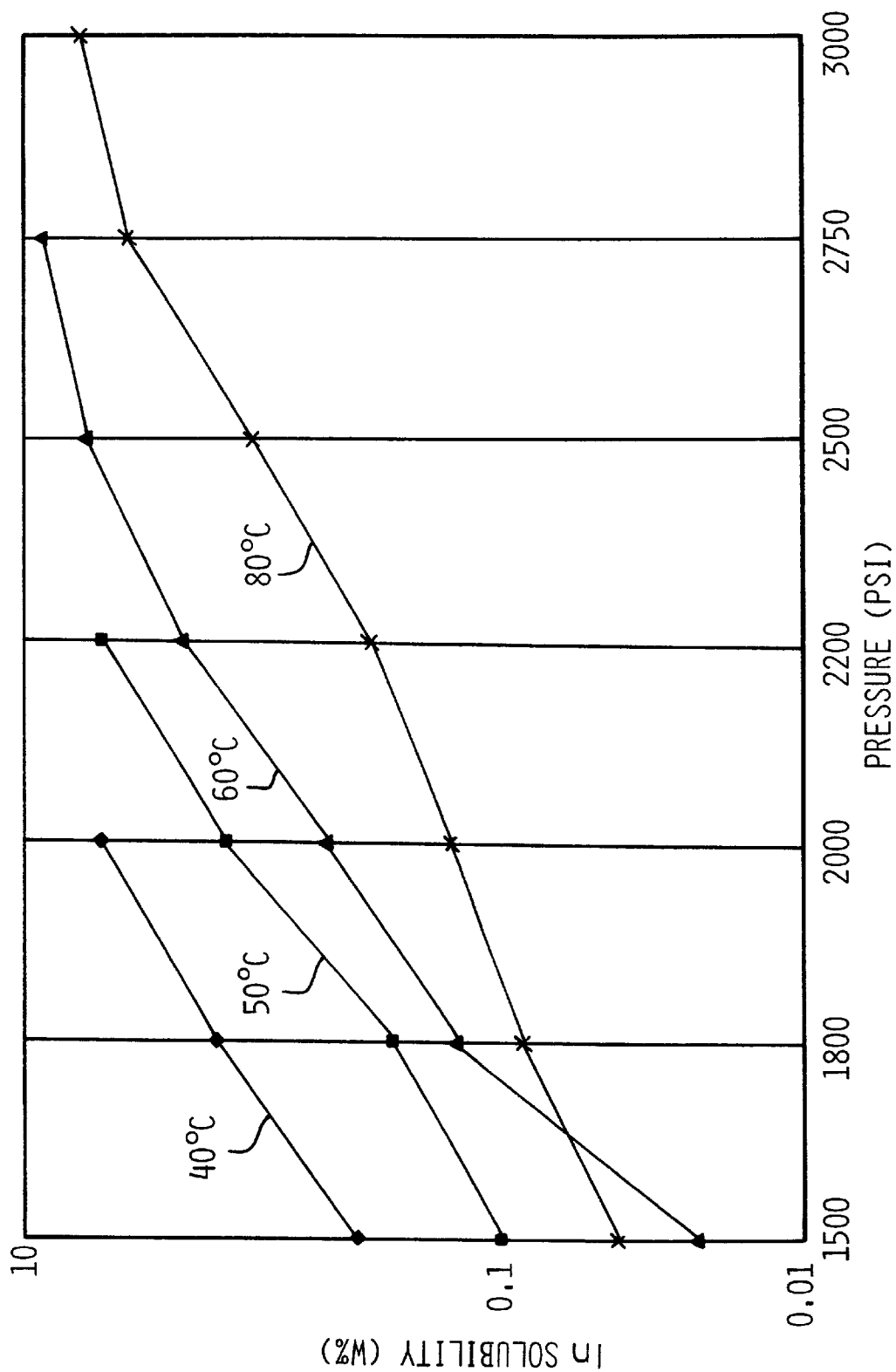
FIG. 2 are solubility curves for DBP in $CO_2$ as a function of temperature and pressure.

It has been demonstrated that secondary lithium ion batteries fabricated by the inventive process wherein the extraction fluids chosen are from the lower end of the $CO_2$ critical region (less than about 6000 psi and about 80° C.) exhibited improved electrochemical performance as compared to batteries produced by the same process except that the plasticizer was extracted using $CO_2$ of higher pressures and temperatures. It is believed that the differences are attributable to the high solubility of DBP in $CO_2$ which is graphically illustrated in FIG. 2. Specifically, when a battery containing plasticizer (e.g., DBP) is exposed to supercritical $CO_2$, high levels of $CO_2$ will dissolve in the plasticizer. Fluctuations in the temperature and pressure thereafter cause $CO_2$ bubbles to form thereby forcing the anode, separator, and cathode films to delaminate, that is, being detached although not necessary fully detached.

For the following examples, secondary lithium ion cells fabricated substantially in accordance with the procedures set forth in Examples 1–3 were subject to extraction with either $CO_2$ by the inventive process or with methanol. The batteries tested each comprised 9 bicells laminated together with each bicell comprising an anode and a cathode with each electrode comprising a current collector having an electrode layer laminated on both sides of the current collector. The graphite for the anode comprised a 50:50 mixture of a synthetic graphite available under the designation SFG-15™ from Lonza G & T, Let. (Sins, Switzerland) and graphitized mesocarbon microbeads available under the designation MCMB25–28™ from Osaka Gas Co., Japan.

EXAMPLE 4

Control batteries were fabricated in which the plasticizer (DBP) was extracted with methanol and inventive batteries were fabricated in which the plasticizer was extracted with supercritical $CO_2$ under different operating conditions. Specifically each control battery was submerged in a bath containing 50 ml of methanol for 20 minutes. This procedure was repeated twice with fresh methanol. In contrast, each inventive battery was placed in a chamber that was connected to a source of carbon dioxide which was continuously pumped into the chamber. The following table sets forth the parameters and conditions for 7 sets of batteries that were so prepared. As is apparent, 3 temperature/pressure regimes were employed and they are designated as extraction conditions 1, 2, and 3.

| Set No. | 1 | 2 | 3 | 4 | 5 | 6 | 7 |
|---|---|---|---|---|---|---|---|
| Extraction Conditions | 1 | 2 | 3 | 1 | 1 | 2 | 2 |
| Pressure (psi) | 2575 | 1850 | 2000 | 2575 | 2575 | 1850 | 1850 |
| Temperature ° (C.) | 40 | 40 | 40 | 40 | 40 | 40 | 40 |
| Solvent/Feed ratio[1] | 26 | 60 | 47 | 26 | 28 | 60 | 60 |
| $CO_2$ used (Standard Liters [SL]) | 1990 | 4550 | 6900 | 3830 | 5580 | 11800 | 11620 |
| Total run time (min.) | 40 | 120 | 140 | 90 | 125 | 270 | 270 |
| Pressure Let Down Time (min.) | 30 | 40 | 40 | 42 | 45 | 35 | 35 |
| Average flow rate SL/min.[2] | 47.5 | 42.5 | 50 | 45 | 45 | 45 | 42.5 |
| Grams of DBP collected | 27.4 | 27.7 | 52.0 | 50.8 | 69.2 | — | 69.6 |
| Total wt. (grams) loss | 137.4 | 136.5 | 263.6 | 264.82 | 353.51 | 353.94 | 348.5 |
| Average wt. loss from cell (%) | 19.8 | 19.8 | 19.6 | 19.7 | 19.7 | 19.6 | 20 |

1. denotes the ratio of total $CO_2$ (wt) employed to weight of battery in chamber.
2. denotes the rate (psi/min.) at which chamber was allowed to decompress following extraction.

Representative cell performance data for batteries (control and inventive) are provided in FIGS. 3, 4, 5, 6A and 6B. In graphs 3–5, the control batteries are designated "A" and the inventive batteries "B". Specifically, designations "1B," "2B" and "3B" specify batteries made by $CO_2$ removal under extraction conditions 1, 2, and 3 respectively and designations "1A," "2A" and "3A" specify the accompanying control batteries.

Figure 5:
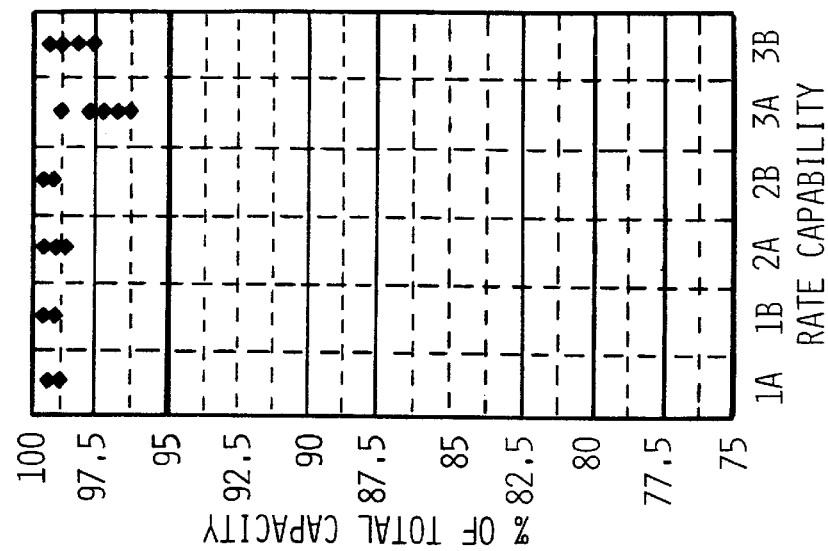
FIG. 5 is a graph showing the cycling rate capability of various secondary lithium ion batteries fabricated by the inventive process.
Figure 4:
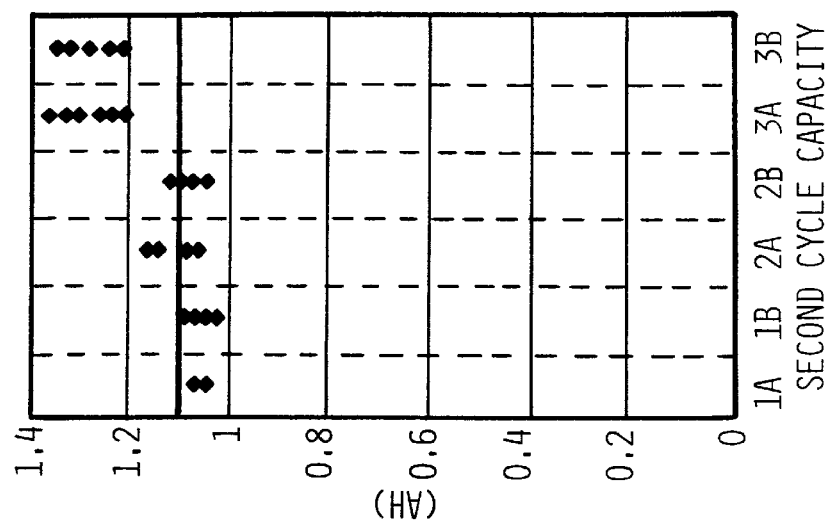
FIG. 4 is a graph showing the second cycle capacity of various secondary lithium ion batteries fabricated by the inventive process.
Figure 3:
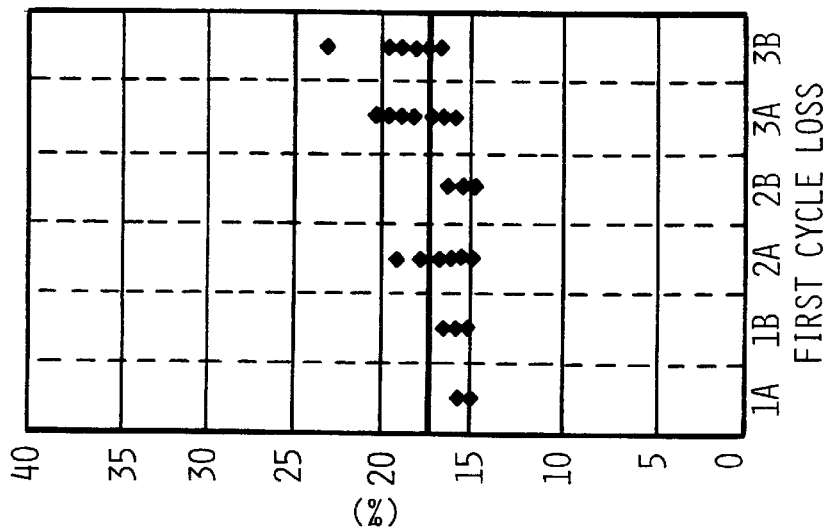
FIG. 3 is a graph showing the first cycle loss of various secondary lithium ion batteries fabricated by the inventive process.
Figure 6A:
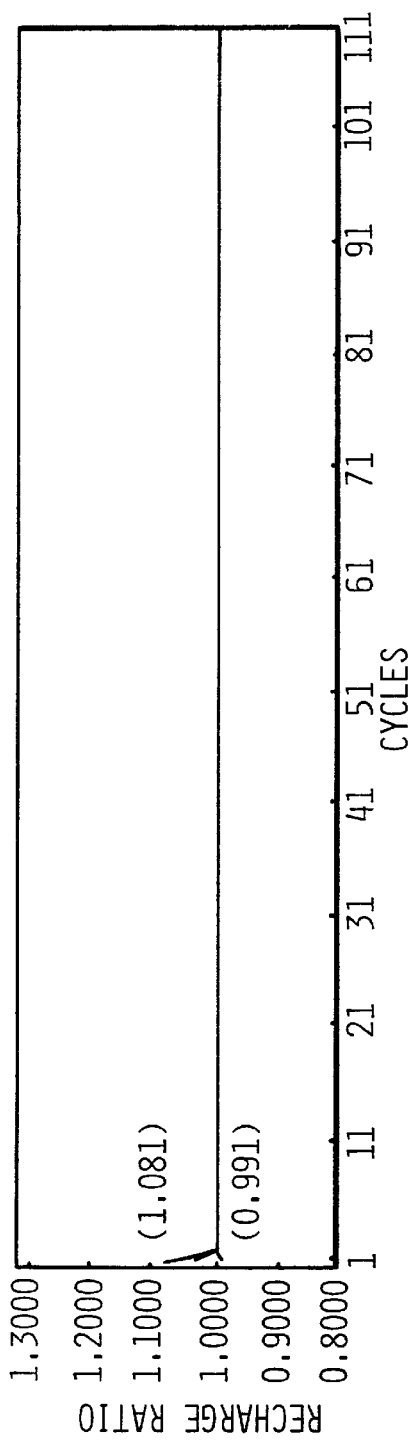
FIGS. 6A and 6B are the discharge capacity and recharge ratio vs. cycles for secondary lithium ion batteries fabricated by the inventive process.
Figure 6B:
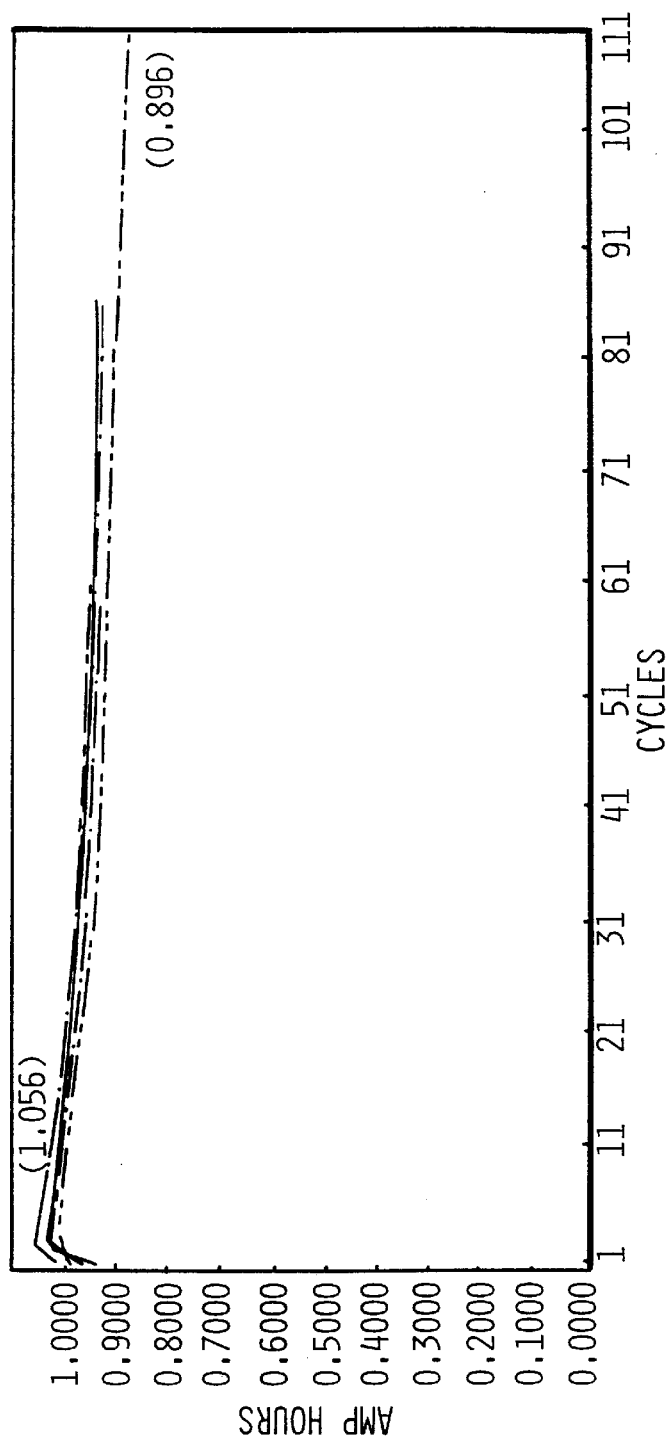

FIG. 3 is a graph showing the first cycle losses for the batteries. FIG. 4 shows the second cycle capacities of the same batteries and FIG. 5 shows their rate capabilities (at 2mA/cm$^2$). Finally, FIGS. 6A and 6B show the discharge capacity and recharge ratio vs. cycles of inventive set number of batteries in the above table.

As is apparent, the electrochemical performance of batteries wherein the DBP plasticizer was extracted by $CO_2$ is comparable to those of the controls wherein the plasticizer was extracted with methanol.

It should be noted that the rate of pressure let down is important in the $CO_2$ extraction process. Reducing the pressure too fast will cause the cell to swell due to $CO_2$ diffusion into the polymer matrix.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method of preparing an electrochemical cell comprising an anode, a cathode, and a polymeric layer interposed between the anode and cathode which comprises the steps of:
    (a) forming an anode composition comprising a carbon material, a first polymer, and a first plasticizer;
    (b) forming a cathode composition comprising a cathode active material, a second polymer, and a second plasticizer;
    (c) forming a polymeric matrix comprising a third polymer and third plasticizer that is interposed between the anode composition and cathode composition, wherein the polymeric matrix formed has a first surface that is attached to a surface of the cathode composition and a second surface that is attached to a surface of the anode composition; and
    (d) removing said first, second, and third plasticizers by extraction with a supercritical fluid comprising carbon dioxide to form an electrochemical cell precursor which comprises contacting said anode composition, cathode composition, and polymeric matrix to said supercritical fluid, wherein said supercritical fluid during said contacting is maintained for a sufficient length of time such that the supercritical fluid takes up at least a portion of said plasticizers, and wherein during said contact the temperature of the supercritical fluid is maintained between about 32° C. to 60° C. and the pressure of the supercritical fluid is maintained between about 1,100 psi to 4,000 psi and wherein step (d) substantially does not cause any detachment of the cathode composition from the first surface of the polymeric matrix and substantially does not cause detachment of the anode composition from the second surface of the polymeric matrix.

2. The method of claim 1 further comprising the step of introducing an electrolyte solution comprising an electrolyte solvent and salt into the electrochemical precursor, after step d.

3. The method of claim 1 wherein the temperature ranges from about 35° C. to 50° C. and the pressure ranges from about 1,600 psi to 3,000 psi.

4. The method of claim 1 wherein the temperature ranges from about 35° C. to 45° C. and the pressure ranges from about 1,800 psi to 2,600 psi.

5. The method of claim 1 wherein the first, second, and third plasticizers comprise dibutyl phthalate.

6. The method of claim 1 wherein the supercritical fluid consists essentially of carbon dioxide.

7. The method of claim 1 wherein the temperature ranges from about 35° C. to 50° C. and the pressure ranges from about 1,600 psi to 3,000 psi.

8. The method of claim 5 wherein the temperature ranges from about 35° C. to 45° C. and the pressure ranges from about 1,800 psi to 2,600 psi.

9. The method of claim 2 which further comprises the step of removing moisture from the electrochemical cell precursor before introducing the electrolyte solution.

10. The method of claim 5 wherein the first, second, and third polymers comprise a copolymer of polyvinylidene difluoride and hexafluoropropylene.

11. The method of claim 1 wherein step (d) further comprises removing said supercritical fluid loaded with said portion of plasticizer taken up during said contacting.

12. A method of preparing an electrochemical cell comprising an anode, a cathode, and a polymeric layer positioned between the anode and cathode which comprises the steps of:
    (a) forming an anode composition comprising a carbon material, a first polymer, and a first plasticizer;
    (b) forming a cathode composition comprising a cathode active material, a second polymer, and a second plasticizer;

(c) forming a polymeric matrix comprising a third polymer and a third plasticizer that is positioned between the anode composition and cathode composition wherein the polymeric matrix formed has a first surface that is attached to a surface of the cathode composition and a second surface that is attached to a surface of the anode composition; and (d) removing said first, second, and third plasticizers by extraction with a supercritical fluid to form an electrochemical cell precursor by a process comprising the steps of:
  (i) providing an apparatus that comprises:
    a sealable chamber defining a compartment adapted to receive an article containing a plasticizer;
    means for circulating a supercritical fluid into said compartment that comes into contact with said article; and
    means for separating supercritical fluid and plasticizer from a mixture of supercritical fluid and plasticizer;
  (ii) placing said anode composition, cathode composition, and polymeric matrix into said compartment and contacting the same with a supercritical fluid that comprises carbon dioxide, wherein said supercritical fluid during said contacting is maintained for a sufficient length of time such that the supercritical fluid takes up at least a portion of said plasticizers, and wherein during said contact the temperature of the supercritical fluid is maintained between about 32° C. to 60° C. and the pressure of the supercritical fluid is maintained between about 1,100 psi and 4,000 psi; and
  (iii) removing said supercritical fluid loaded with said portion of plasticizer taken up during said contacting wherein step (d) substantially does not cause any detachment of the cathode composition from the first surface of the polymeric matrix and substantially does not cause detachment of the anode composition from the second surface of the polymeric matrix.

13. The method of claim 12 further comprising the step of introducing an electrolyte solution comprising an electrolyte solvent and salt into the electrochemical precursor after step (d).

14. The method of claim 12 wherein the temperature ranges from about 35° C. to 50° C. and the pressure ranges from about 1,600 psi to 3,000 psi.

15. The method of claim 12 wherein the temperature ranges from about 35° C. to 45° C. and the pressure ranges from about 1,800 psi to 2,600 psi.

16. The method of claim 12 wherein the first, second, and third plasticizers comprise dibutyl phthalate.

17. The method of claim 12 wherein the supercritical fluid consists essentially of carbon dioxide.

18. The method of claim 17 wherein the temperature ranges from about 35° C. to 50° C. and the pressure ranges from about 1,600 psi to 3,000 psi.

19. The method of claim 17 wherein the temperature ranges from about 35° C. to 45° C. and the pressure ranges from about 1,800 psi to 2,600 psi.

20. The method of claim 13 which further comprises the step of removing moisture from the electrochemical cell precursor before introducing the electrolyte solution.

21. The method of claim 17 wherein the first, second, and third polymers comprise a copolymer of polyvinylidene difluoride and hexafluoropropylene.

22. The method of claim 12 wherein step (d) further comprises removing said supercritical fluid loaded with said portion of plasticizer taken up during said contacting.

23. The method of claim 12 wherein step (ii) comprises circulating said supercritical fluid into and out of the compartment.

24. The method of claim 12 wherein step (iii) comprises separating supercritical fluid and plasticizer from a mixture of supercritical fluid and plasticizer exiting the compartment.

25. The method of claim 12 wherein step (iii) comprises separating supercritical fluid and plasticizer from a mixture of supercritical fluid and plasticizer exiting the compartment.

26. The method of claim 12 wherein the first, second, and third polymers comprise a copolymer of vinylidene difluoride and hexafluoropropylene.

27. The method of claim 12 wherein step (ii) comprises phase shifting said supercritical fluid between a supercritical state and a subcritical state or a liquid state.

28. The method of claim 20 wherein the step of removing the moisture comprises circulating gas into said compartment to remove moisture from said electrochemical cell precursor.

29. The method of claim 28 wherein the gas is selected from the group consisting of air, nitrogen, argon and carbon dioxide.

30. The method of claim 29 wherein said gas is heated.

* * * * *